United States Patent
Keller et al.

(10) Patent No.: US 8,921,510 B1
(45) Date of Patent: Dec. 30, 2014

(54) PHTHALONITRILE PREPOLYMER INTERMEDIATE

(71) Applicants: Teddy M. Keller, Fairfax Station, VA (US); Matthew Laskoski, Springfield, VA (US)

(72) Inventors: Teddy M. Keller, Fairfax Station, VA (US); Matthew Laskoski, Springfield, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 14/497,882

(22) Filed: Sep. 26, 2014

Related U.S. Application Data

(60) Provisional application No. 61/886,126, filed on Oct. 3, 2013.

(51) Int. Cl.
| | | |
|---|---|---|
| *C08G 69/26* | (2006.01) | |
| *C08G 73/00* | (2006.01) | |
| *C08G 73/02* | (2006.01) | |
| *C08G 69/28* | (2006.01) | |
| *C08G 65/40* | (2006.01) | |

(52) U.S. Cl.
CPC .............. *C08G 73/00* (2013.01); *C08G 73/024* (2013.01); *C08G 65/40* (2013.01)
USPC ............ 528/332; 528/210; 528/211; 528/362

(58) Field of Classification Search
USPC ........... 524/430, 445, 496; 525/538; 528/213, 528/320; 558/412; 568/315
See application file for complete search history.

(56) References Cited

U.S. PATENT DOCUMENTS

| | | |
|---|---|---|
| 4,209,458 A | 6/1980 | Keller et al. |
| 4,408,035 A | 10/1983 | Keller |
| 4,409,382 A | 10/1983 | Keller |
| 4,410,676 A | 10/1983 | Keller |
| 4,619,986 A | 10/1986 | Keller |
| 5,003,039 A | 3/1991 | Keller |
| 5,003,078 A | 3/1991 | Keller |
| 5,004,801 A | 4/1991 | Keller et al. |
| 5,132,396 A | 7/1992 | Keller |
| 5,159,054 A | 10/1992 | Keller |
| 5,202,414 A | 4/1993 | Keller et al. |
| 5,208,318 A | 5/1993 | Keller |
| 5,237,045 A | 8/1993 | Burchill et al. |
| 5,247,060 A | 9/1993 | Keller |
| 5,262,514 A | 11/1993 | Keller |
| 5,292,854 A | 3/1994 | Keller |
| 5,304,625 A | 4/1994 | Keller |
| 5,350,828 A | 9/1994 | Keller et al. |
| 5,352,760 A | 10/1994 | Keller |
| 5,389,441 A | 2/1995 | Keller |
| 5,464,926 A | 11/1995 | Keller |
| 5,895,726 A | 4/1999 | Imam et al. |
| 5,925,475 A | 7/1999 | Sastri et al. |
| 5,939,508 A | 8/1999 | Keller |
| 5,965,268 A | 10/1999 | Sastri et al. |
| 5,980,853 A | 11/1999 | Keller et al. |
| 6,001,926 A | 12/1999 | Sastri et al. |
| 6,297,298 B1 | 10/2001 | Keller et al. |
| 6,756,470 B2 | 6/2004 | Keller et al. |
| 6,891,014 B2 | 5/2005 | Keller et al. |
| 7,087,707 B2 | 8/2006 | Keller et al. |
| 7,342,085 B2 | 3/2008 | Keller et al. |
| 7,348,395 B2 | 3/2008 | Keller et al. |
| 7,452,959 B2 | 11/2008 | Keller et al. |
| 7,511,113 B2 | 3/2009 | Keller et al. |
| 7,723,420 B2 | 5/2010 | Laskoski et al. |
| 7,897,715 B1 | 3/2011 | Laskoski et al. |
| 8,039,576 B2 | 10/2011 | Laskoski et al. |
| 8,222,403 B2 | 7/2012 | Laskoski et al. |
| 8,288,454 B2 | 10/2012 | Keller et al. |
| 8,362,239 B2 | 1/2013 | Laskoski et al. |
| 8,735,532 B2 | 5/2014 | Keller et al. |
| 2014/0275472 A1 | 9/2014 | Keller et al. |

OTHER PUBLICATIONS

Gielen et al., "A novel approach to amidines from esters" Tetrahedron Letters 43 (2002) 419-421.
Keller, "Synthesis and Polymerization of Multiple Aromatic Ether Phthalonitriles" Chem. Mater. 1994, 6, 302-305.
Laskoski et al., "Improved Synthesis of Oligomeric Phthalonitriles and Studies Designed for Low Temperature Cure" J. Polym. Sci. A: Polym. Chem. 2014, 52, 1662-1668.
Sastri et al., "Phthalonitrile Cure Reaction with Aromatic Diamines" Journal of Polymer Science: Part A: Polymer Chemistry, vol. 36, 1885-1890 (1998).

(Continued)

*Primary Examiner* — Terressa Boykin
(74) *Attorney, Agent, or Firm* — US Naval Research Laboratory; Joseph T. Grunkemeyer

(57) ABSTRACT

A compound having: one or more of the below repeat units, one or more terminating Ar—NH— groups bound to carbon radicals, and one or more terminating —H groups bound to nitrogen radicals. Each R is an organic group and each Ar is an aromatic group. The compound is not a thermoset. A method of: mixing an aromatic amine having the formula Ar—NH$_2$ with a phthalonitrile compound, heating the mixture to form the compound described above, and cooling the mixture before the onset of gelation.

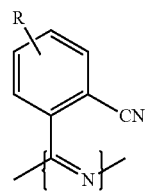

20 Claims, 2 Drawing Sheets

(56) References Cited

OTHER PUBLICATIONS

Sastri et el., "Phthalonitrile-Carbon Fiber Composites" Polymer Composites, Dec. 1996, vol. 17, No. 6.

Snow et al., "Syntheses and Characterization of Heteroatom-Bridged Metal-Free Phthalocyanine Network Polymers and Model Compounds" Macromolecules 1984, 17, 1614-1624.

Sumner, "High Performance Materials Containing Nitrile Groups" Dissertation (2003).

PHTHALONITRILE PREPOLYMER INTERMEDIATE

This application claims the benefit of U.S. Provisional Application No. 61/886,126, filed on Oct. 3, 2013. The provisional application and all other publications and patent documents referred to throughout this nonprovisional application are incorporated herein by reference.

TECHNICAL FIELD

The present disclosure is generally related to phthalonitrile synthesis.

DESCRIPTION OF RELATED ART

Phthalonitrile polymers based on low melting oligomeric phthalonitriles can exhibit superior flammability and high temperature properties, relative to other high temperature polymers. Until recently, bisphenol-based and oligomeric aromatic phthalonitrile polymers have been cured to gelation/solid at temperatures above 200° C. The phthalonitrile (PN) technology was designed to replace polyimides for aircraft applications and vinyl esters/epoxy resins for ship applications due to their improved processability and superior physical characteristics. Phthalonitrile resins can show potential as matrix materials for advanced composites. Until the synthesis of the oligomeric aromatic phthalonitriles, the polymerization reactions had to be carried-out at temperatures at or greater than 250° C., which is slightly greater than the melting point of the first generation aromatic phthalonitriles, which are synthesized from the salts of the bisphenol and 4-nitrophthalonitrile. The phthalonitrile monomers polymerize through the cyano groups with the aid of an appropriate curing agent to yield a crosslinked polymeric network with high thermal and oxidative stabilities. These polymers are obtained by heating the phthalonitrile monomers and a small amount of curing additive in the melt-state at or above 200° C. for extended periods of time. Moreover, a low viscosity resin enables composite processing by resin transfer molding (RTM), resin infusion methods, and other low-cost manufacturing techniques. Furthermore, a low melt viscosity and a larger processing window are useful for fabrication of thick composite sections where the melt has to impregnate thick fiber performs.

The oligomeric phthalonitrile monomers that melt above 40° C. but below 150° C., can exhibit outstanding flammability properties upon polymerization for ship, submarine, aerospace, and other domestic applications and can withstand high temperatures (300-375° C.) in oxidative environments such as air. The use of low molecular weight precursor resins to obtain thermosetting polymeric materials with high thermo-oxidative properties is often advantageous from a processing standpoint. Liquid precursor resins such as the liquid oligomeric phthalonitriles are useful in composite fabrication by a variety of methods such as resin infusion molding, resin transfer molding, and prepreg consolidation. Furthermore, resins with a large processing window between the melting point and the cure temperature are desirable to control the viscosity and the rate of curing for fabrication of shaped fiber reinforced composite components by cost effective methods such as resin transfer molding (RTM) and resin infusion molding (RIM).

Previously, a variety of phthalonitrile monomers containing aromatic ether, thioether, imide, and sulfone linkages between the terminal phthalonitrile units have been synthesized and cured or converted to crosslinked/networked polymers. The cure reaction of these monomers has been investigated by a variety of curing additives such as organic amines, strong organic acids, strong organic acids/amine salts, metallic salts, and metals at temperatures in excess of 250° C. When post-cured at elevated temperatures to about 400° C., the thermosets do not exhibit a glass transition temperature ($T_g$) and show excellent long-term thermal and oxidative stabilities to temperatures approaching 375° C. In addition, the high aromatic content of the thermoset affords a high char yield (80-90%) when pyrolyzed to 1000° C. under inert conditions. The high thermal stability and the ability to form a high char yield (very little gas formation) upon pyrolysis contribute to the outstanding fire performance of the phthalonitrile polymer. For instance, the fire performance of phthalonitrile-carbon and phthalonitrile-glass composites are superior to that of other thermoset-based composites currently in use for aerospace, ship, and submarine applications. The phthalonitriles are still the only polymeric material that meets MIL-STD-2031 for usage inside of a submarine.

BRIEF SUMMARY

Disclosed herein is a compound comprising: one or more first repeat units having the formula of Eq. (1), one or more terminating Ar—NH— groups bound to carbon radicals, and one or more terminating —H groups bound to nitrogen radicals. Each R is an organic group and each Ar is an aromatic group. The compound is not a thermoset.

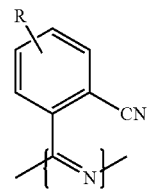

Eq. (1)

Also disclosed herein is a method comprising: mixing an aromatic amine having the formula Ar—NH$_2$ with a phthalonitrile compound having the formula of Eq. (2), heating the mixture to form the compound described above, and cooling the mixture before the onset of gelation.

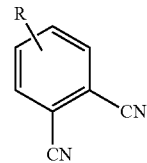

Eq. (2)

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Figure 1:
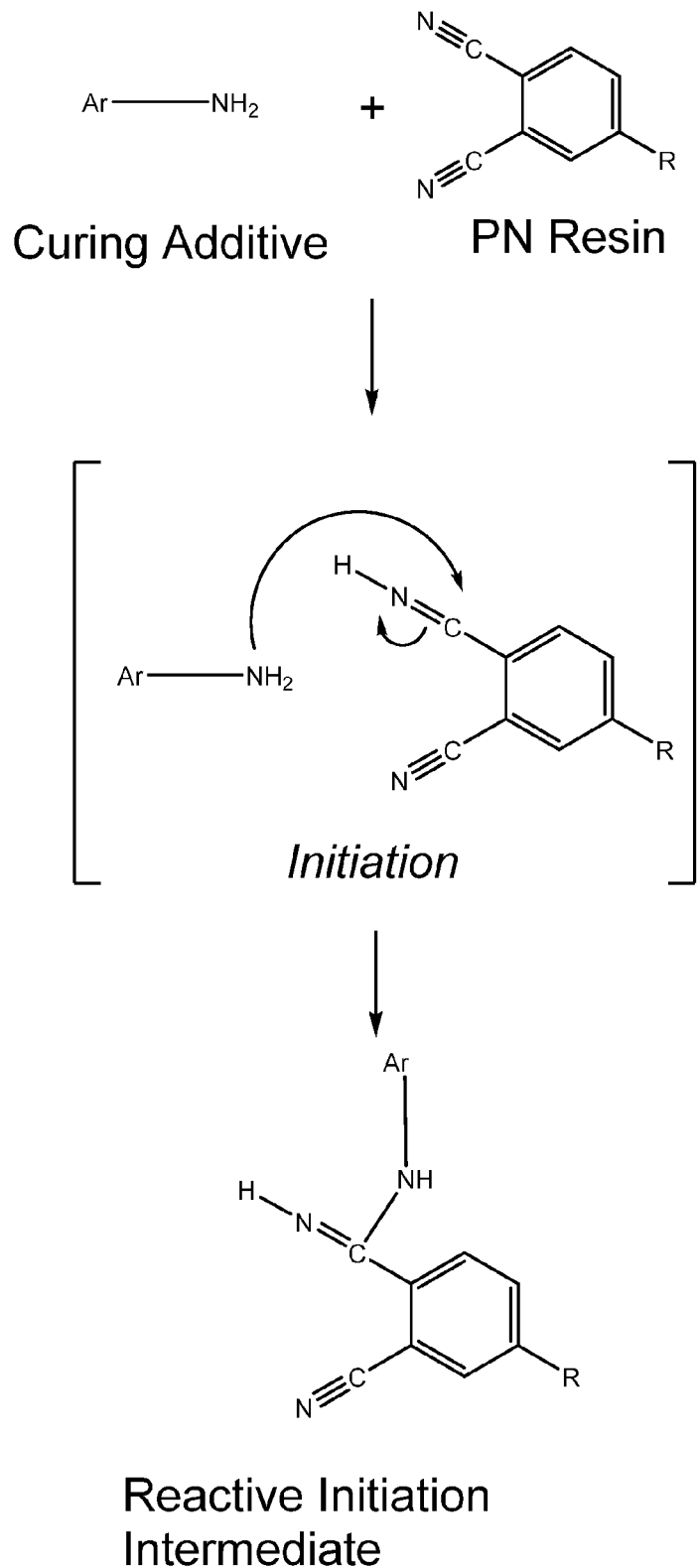
FIG. 1 shows a reaction scheme of an aromatic amine initiating a PN monomer to form a reactive PN intermediate.
Figure 2:
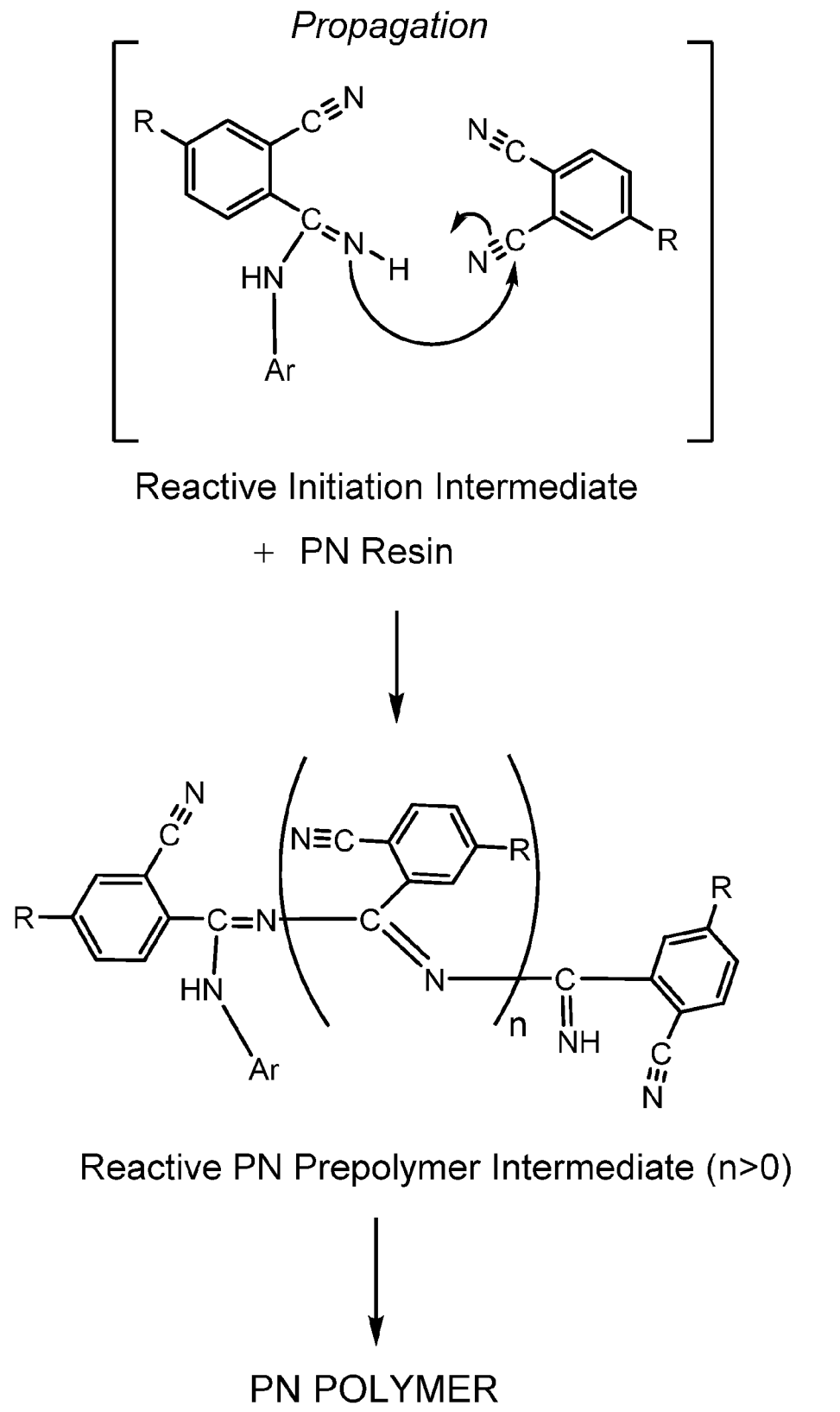
FIG. 2 shows a reaction of the reactive PN intermediate propagating to form a reactive PN prepolymer intermediate.

Disclosed herein is the synthesis of a reactive phthalonitrile (PN) prepolymer intermediate, which occurs at a stage before gelation from the initial reaction of curing additives such as an aromatic diamine with a phthalonitrile resin (see FIGS. 1 and 2). The reactive PN prepolymer intermediate can be isolated and used as a curing additive for PN resins, in general, and can also be isolated and used for applications such as the automotive industry needing rapid conversion to (1) shaped solid polymer or (2) in the manufacture of shaped composite components. The initiation reaction involving the initial reaction of a typical curing additive with any phthalonitrile is the slow step in the overall PN polymerization reaction to form the reactive initiation intermediate (FIG. 1). The propagation reaction (stage where reactive PN prepolymer intermediate exists) is the fast reaction in the polymerization reaction and involves the further thermal reaction of the reactive initiation intermediate with additional PN resin to form the reactive PN prepolymer intermediate (FIG. 2).

The reactive PN initiation intermediate is defined as a reaction intermediate formed from the intimate interaction of the curing additive with the PN units. Further reaction (fast reaction) of the reactive initiation intermediate with additional PN resin causes an increase in molecular weight and viscosity of the reaction media (propagation reaction) to the reactive PN prepolymer intermediate. The reactive PN prepolymer intermediate can be very reactive depending on the extent of the reaction initiation reaction with PN resin as determined by an increase in the viscosity of the curing additive-PN mixture and conversion to the shaped solid can be readily controlled as a function of temperature and extent of the reaction to the reactive PN prepolymer intermediate. The highly reactive PN prepolymer intermediate can be isolated and used itself as a curing additive for the PN resins or as an isolated composition that can be rapidly remelted and converted to gelation and shaped phthalonitrile components. Gelation or conversion to a shaped solid will occur if the reaction involving the reactive PN prepolymer intermediate is permitted to progress into the rubbery state and ultimately to the fully cured polymer. The reactive PN prepolymer intermediate can allow for the rapid cure to a thermoset at temperatures in excess of, for example, 150° C. from minutes to longer periods depending on the temperature and the extent of the reaction to the reactive PN prepolymer intermediate stage as measured by the change in the viscosity of the initiation mixture after the curing additive-phthalonitrile resin is heated in the melt at a temperature where reaction commences to occur usually above 150° C. The formation of the reactive PN prepolymer intermediate, as indicated by an increase in viscosity and overall molecular weight of the intermediate composition, will occur more readily at higher temperatures. The reactive PN prepolymer intermediate/composition, upon removal of the heat and cooling to ambient temperatures, is stable indefinitely without further reaction and does not have to be stored under freezer conditions but can be remelted and rapidly converted to gelation above 200° C., if desired.

The disclosed method includes, but is not limited to, (1) the formation of the highly reactive PN prepolymer intermediate, resulting from reaction of the reactive initiation intermediate with additional phthalonitrile units and the further fast reaction (propagation reaction) of the resulting PN prepolymer intermediate with more phthalonitrile units involving the propagation step to any stage before gelation, (2) isolation of the PN prepolymer intermediate without further reaction at room temperature or ambient condition, and (3) rapid conversion of the PN prepolymer intermediate upon thermal exposures to temperatures in excess of 150° C. to complete the propagation polymerization reaction to a shaped component resulting in gelation in a matter of minutes, if desired. This reactive PN prepolymer intermediate may be useful in the fabrication of fire resistant automotive and construction components needing rapid cure to a shaped component. The curing additive may be those already known as curing agents for the phthalonitriles including, but not limited to, (1) aromatic diamines, (2) a combination of metal salts and strong inorganic and/or organic acid, (3) strong acids, (4) metal and/or metal salts, and (5) strong Lewis acids. The time to the reactive PN prepolymer intermediate and the extent of cure of the intermediate may be controlled as a function of the curing additive, amount of curing additive, and the temperature.

This method involves the reaction of curing additives with any phthalonitrile resin and the isolation of the reactive PN prepolymer intermediate (FIGS. 1 and 2) formed from reaction of the reactive initiation intermediate with additional phthalonitrile resin. The initial formation of reactive initiation intermediate from the initial reaction of the curing additive with the PN resin is the slow step in the PN polymerization reaction. Once the initial slow initiation reaction occurs, the propagation reaction commences to form the reactive PN prepolymer intermediate involving further reaction of the initiation reaction intermediate with additional phthalonitrile and involving an increase in the viscosity of the reaction media and an increase in the molecular weight of the reactive PN prepolymer intermediate; this is the propagation step in the polymerization reaction and is highly reactive compared to the initial stage of the initiation reaction. FIGS. 1 and 2 show the reaction of an aromatic diamine with a phthalonitrile unit of the phthalonitrile resin resulting in the initiation reaction to reaction initiation intermediate to reaction initiation intermediate +PN resin to reactive PN prepolymer intermediate (highly reactive) to cured PN polymer.

Low melting oligomeric phthalonitriles can be cured to gelation or a shaped solid in the presence of curing additive mixtures (a combination of metal salts and strong inorganic and organic acids) below 200° C. with various amounts of the curing additive mixture (1-20 wt % or 5-10 wt %) relative to the phthalonitrile. The precursor composition (phthalonitrile monomer and curing additive) can be mixed under ambient conditions or can be added at any temperature below 200° C. The precursor composition (curing additive and PN resin) can be prepared at room temperature and can be heated to a reactive PN prepolymer intermediate but before gelation occurs. Further heating above 150° C. will result in further reaction of the PN intermediate with PN resin during the propagation step and, if heated long enough, in the composition becoming rubbery and ultimately gelation to the shaped solid. At this point, the solid PN polymer will retain its shape and can be placed in a high temperature furnace/oven at temperatures up to 500° C. to fully cure to a polymer that does not exhibit a glass transition temperature ($T_g$). However, the reaction mixture can be stopped at any point during the propagation step (reactive PN prepolymer intermediate) before gelation occurs and used as a curing PN additive or can be isolated as prepolymer PN composition for rapid conversion to a fully cured shaped solid configuration. Any phthalonitrile monomer(s) that exist in the liquid state below 250° C. can be converted to the reactive PN prepolymer intermediate. Such phthalonitriles include the simple bisphenol-based phthalonitriles of bisphenol A (bisphenol A phthalonitrile, m. p. 195-

198° C.) and resorcinol (resorcinol phthalonitrile, m.p. 173-175° C.), the multiple aromatic ether oligomeric phthalonitriles and the aromatic ether PEEK-like phthalonitriles.

In this first step of the method, an aromatic amine having the formula Ar—NH$_2$ is mixed with a phthalonitrile compound having the formula of Eq. (2). Suitable phthalonitriles and aromatic amines are known in the art including, but not limited to, those disclosed in U.S. Pat. No. 3,730,946, U.S. Pat. No. 3,763,210, U.S. Pat. No. 3,787,475, U.S. Pat. No. 3,869,499, U.S. Pat. No. 3,972,902, U.S. Pat. No. 4,209,458, U.S. Pat. No. 4,223,123, U.S. Pat. No. 4,226,801, U.S. Pat. No. 4,234,712, U.S. Pat. No. 4,238,601, U.S. Pat. No. 4,259,471, U.S. Pat. No. 4,304,896, U.S. Pat. No. 4,307,035, U.S. Pat. No. 4,315,093, U.S. Pat. No. 4,351,776, U.S. Pat. No. 4,408,035, U.S. Pat. No. 4,409,382, U.S. Pat. No. 4,410,676, U.S. Pat. No. 5,003,039, U.S. Pat. No. 5,003,078, U.S. Pat. No. 5,004,801, U.S. Pat. No. 5,132,396, U.S. Pat. No. 5,159,054, U.S. Pat. No. 5,202,414, U.S. Pat. No. 5,208,318, U.S. Pat. No. 5,237,045, U.S. Pat. No. 5,242,755, U.S. Pat. No. 5,247,060, U.S. Pat. No. 5,292,854, U.S. Pat. No. 5,304,625, U.S. Pat. No. 5,350,828, U.S. Pat. No. 5,352,760, U.S. Pat. No. 5,389,441, U.S. Pat. No. 5,464,926, U.S. Pat. No. 5,925,475, U.S. Pat. No. 5,965,268, U.S. Pat. No. 6,001,926, U.S. Pat. No. 6,297,298, U.S. Pat. No. 6,756,470, U.S. Pat. No. 6,891,014, U.S. Pat. No. 7,452,959, U.S. Pat. No. 7,511,113, U.S. Pat. No. 8,039,576, U.S. Pat. No. 8,222,403, U.S. Pat. No. 8,362,239, U.S. Pat. No. 8,530,607, U.S. Pat. No. 8,735,532, and U.S. Pat. No. 8,859,712.

Example phthalonitriles include, but are not limited to, diphthalonitriles such as those shown in Eqs. (3)-(7). Each R' is an organic group, each Ar$^1$ and Ar$^2$ is an aromatic group, and m is a non-negative integer. The nature of the R, R', Ar$^1$, and Ar$^2$ groups is not expected to materially alter the presently disclosed process. The compounds of Eqs. (5)-(7) may be made by reacting a dihalobenzophenone with excess bisphenol A, bisphenol A6F, or resorcinol respectively, followed by reaction with nitrophthalonitrile as detailed in the above patents, such as U.S. Pat. No. 8,735,532 and U.S. Pat. No. 8,859,712. The compound of Eq. (8) may be made by reacting a bis(4-halophenyl) sulfone with excess bisphenol A

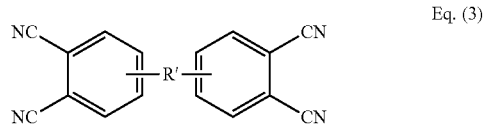

Eq. (3)

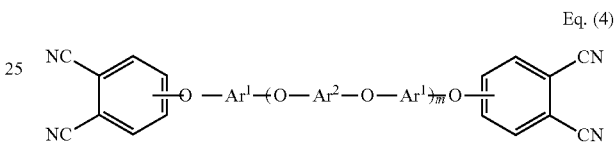

Eq. (4)

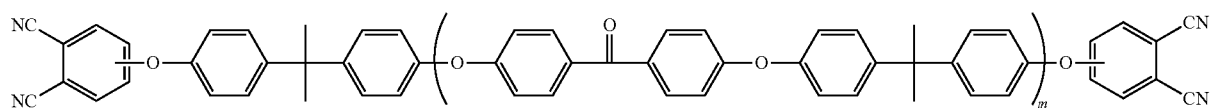

Eq. (5)

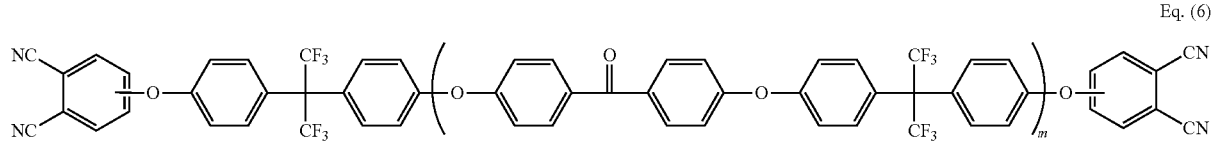

Eq. (6)

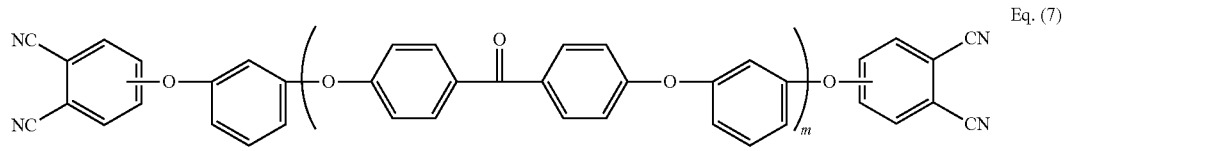

Eq. (7)

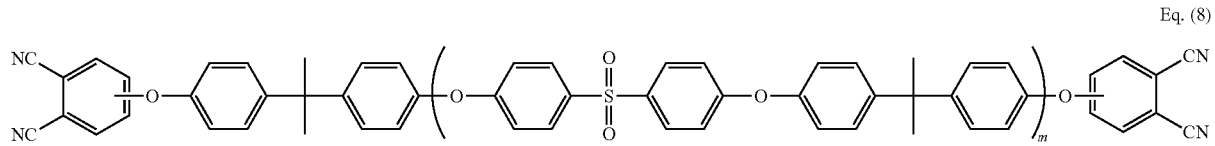

Eq. (8)

The Ar² group may be the residue from a dihaloaromatic. The dihaloaromatic may have an electron withdrawing group that activates both halo groups, either in a single ring or bridging two rings. Benzophenone has an electron withdrawing carbonyl unit to activate the chloro units being displaced by the nucleophilic reaction of the dipotassium or disodium salt of a dihydroxy-terminated aromatic reactant. Other activators may also work to enhance the displacement of the chloro unit, such as sulfonyl (—S(═O)₂—), sulfinyl (—S(═O)—), phosphoryl (—P(═O)—), and multiple carbonyl or other units with the dichloroaromatic compound, to nucleophilic displacement. Other groups known in the art to be electron withdrawing groups may also be used. Dichlorobenzophenenones, including 4,4'-dichlorobenzophenenone, are suitable. Another suitable compound is bis(4-chlorophenyl)sulfoxide. Any dihydroxyaromatic compound may be used, including but not limited to, a biphenol, a bisphenol,2,2-bis(4-hydroxyphenyl)propane, 2,2-bis(4-hydroxyphenyl)-1,1,1,3,3,3-hexafluoropropane, or resorcinol may be used. Other suitable reactants are disclosed in U.S. Pat. Nos. 8,362,239; 8,222,403; 8,039,576; 7,511,113; 7,452,959; 6,891,014; 6,756,470; 6,297,298; 6,001,926; 5,965,268; 5,939,508; 5,925,475; 5,895,726; 5,464,926; 5,389,441; 5,352,760; 5,350,828; 5,304,625; 5,292,854; 5,262,514; 5,247,060; 5,237,045; 5,208,318; 5,202,414; 5,159,054; 5,132,396; 5,004,801; 5,003,078; 5,003,039; 4,619,986; 4,410,676; 4,409,382; 4,408,035; and 4,209,458. Example aromatic amines include, but are not limited to, bis[4-(4-aminophenoxy)phenyl]sulfone, bis[4-(3-aminophenoxy)phenyl]sulfone, 1,3-bis(3-aminophenoxy)benzene, and 1,4-bis(4-aminophenoxy)benzene. The R' group may be bound to, for example, the 4-position of the phthalonitrile group.

During or subsequent to the mixing, the mixture is heated to form an initiation intermediate as shown in FIG. 1. The structure of the initiation intermediate is that of the general formula of Eq. (1) with only one repeat unit, as shown in Eq. (9). The initiation intermediate has an Ar—N-bound to the carbon radical. As used herein "carbon radical" refers to the valence bond shown extending to the left from the carbon atom in any repeat unit depicted in the present specification and claims. The initiation intermediate also has an —H bound to the nitrogen radical. As used herein "nitrogen radical" refers to the valence bond shown extending to the right from the nitrogen atom in any repeat unit depicted in the present specification and claims.

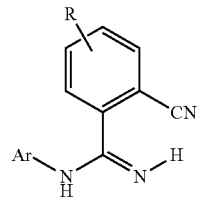

Eq. (9)

Any heating conditions that produce the initiation intermediate may be used, including but not limited to, 150-250° C. or 150-200° C. Care should be taken that the reaction is not heated at too high a temperature or for too long before cooling the mixture. The selection and concentration of the aromatic amine and monomer may also affect the heating time and temperature. In any case, the reaction is cooled before the onset of gelation and the formation of a thermoset. The mixture may be, for example, visually monitored to detect the onset of gelation.

The same heating may also produce the prepolymer intermediate as shown in FIG. 2. The structure of the prepolymer intermediate is that of the general formula of Eq. (1) with more than one repeat unit, as shown in Eq. (10), where n is an integer that is at least 2. The repeat units are bound to each other with the carbon radical of one bound to the nitrogen radical of another. An example prepolymer intermediate with four repeat units is shown in Eq. (11).

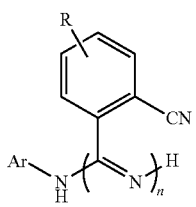

Eq. (10)

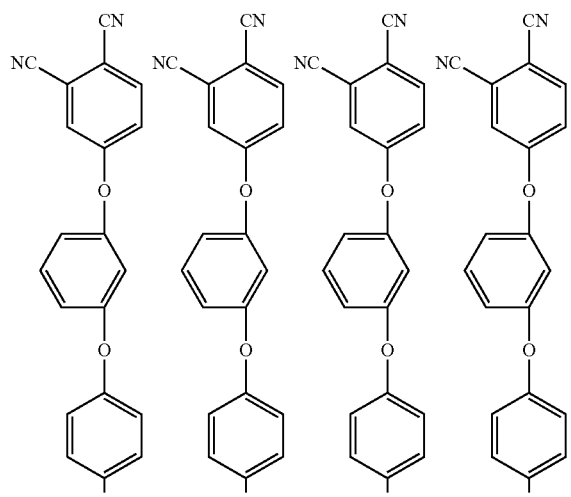

Eq. (11)

-continued

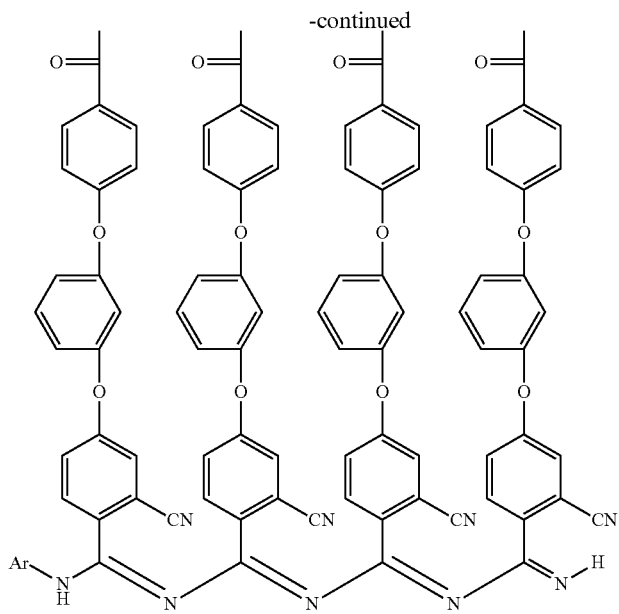

(25)

Once the reactive intermediate or prepolymer intermediate is formed, the reaction is cooled before the onset of gelation. While the intermediates may be in liquid form while the mixture is being heated, once cooled the intermediates may be in solid form and remain stable. The intermediates may be combined with unreacted phthalonitrile monomer and/or aromatic amine in the cooled mixture. Such a mixture may contain, for example, at least 1, 5, 10, 20, 30, 40, or 50 wt % of either or both of the initiation intermediate and the prepolymer intermediate. The presence of either intermediate and its molecular weight in the cooled mixture may be verified by gel permeation chromatography (GPC). Also, the presence of an IR adsorption at 2230 cm$^{-1}$ indicates the presence of the CN groups in the intermediate, which may be reduced or completely absent in a fully cured sample.

Although the compound is not a thermoset, there may be a limited degree of branching due to initiation of the other CN group shown in Eq. (10) to form a second type of repeat unit as shown in Eq. (12) without causing gelation. The extra imine group binds in the same manner as the imine group in the first repeat unit to any of the repeat units disclosed herein and/or to the terminating groups.

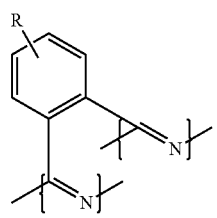

Eq. (12)

A third type of repeat unit without branching may be formed by propagation, rather than initiation, through the second CN group as shown in Eq. (13).

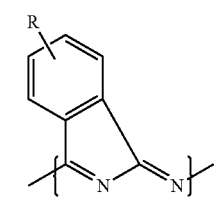

Eq. (13)

Branching is also possible through initiation of a CN group on the other end of a diphthalonitrile. Any of the repeat units may comprise the groups shown in Eq. (14) as the R group, the first of which does not have branching. The R' group is as described above. The different types of repeat units may occur in any sequence and quantity that does not result in gelation or formation of a thermoset. The aromatic amine may also have more than one amine that initiates the reaction with the phthalonitrile.

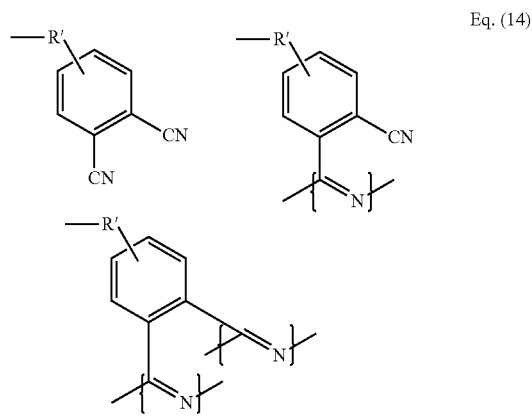

Eq. (14)

The cooled mixture may be heated under thermal conditions that convert the compound to a thermoset. Such thermal conditions are disclosed in the patents listed above. Thermoset formation may be by additional initiation and propagation reactions, and by cyclization of the CN groups to form phthalocyanine groups or triazine groups. Initiation may occur from residual aromatic amine and/or from additional catalyst. Additional phthalonitrile monomer may also be added to the mixture when forming the thermoset.

The development and isolation of the reactive PN prepolymer intermediate opens up applications for the easy to process, flame resistant high temperature PN resins needing a fast cure to gelation or to solid configuration of both polymeric and fiber reinforced composite components such as for the automotive industry and other domestic application. The properties and time to gelation of the reactive PN prepolymer intermediate can be readily controlled from minutes to longer times depending on the value for n (FIG. 2). After the addition of the curing additive to the melt of the PN resin above 150° C., the initiation reaction initially occurs from intimate reaction to the reactive initiation intermediate; the viscosity may not have changed very much at this stage. Further reaction of the reactive initiation intermediate with additional PN resin will result in the formation of the reactive PN prepolymer intermediate and an observed enhancement in the viscosity. The reactive PN prepolymer intermediate can be isolated by quenching to ambient conditions and stored indefinitely without further reaction. The prepolymer intermediate can also be used as a curing additive for PN resins or can be remelted in a shaped reaction vessel or mold and then quickly converted to a shaped polymer by thermal means. In addition, the reactive PN prepolymer intermediate can be used in the fabrication of composite components by cost-effective manufacturing techniques in a controlled manner from minutes to longer reaction times depending on the application.

Prepregs containing the reactive PN prepolymer intermediate curing composition can be stored indefinitely under ambient condition without the need for storage under freezer conditions, which is the case with other resin systems such as epoxy curing compositions. By controlling the initial cure to the reactive PN prepolymer intermediate, industry can use existing autoclaves, shaped molds, and more recent out of the autoclave technologies such as resin transfer molding (RTM), resin infusion molding (RIM), filament winding, and potentially by automated composite manufacturing techniques such as automated tape laying and automated fiber placement, which is currently being used by the aerospace industries. The reactive PN prepolymer intermediate has potential usages in the automotive, ship and aerospace industries. Since the viscosity of the liquid polymerization system can be easily controlled as a function of temperature and the amount of curing additive to the reactive PN prepolymer intermediate, new applications that do not currently exist for the PN resins and needing the flame resistant and high temperature properties of the PN polymer such as the automotive and construction industries are now a reality with the availability of the reactive PN prepolymer intermediate. The ability to cure to a shaped solid below 200° C. and the superior physical properties relative to other high temperature polymers such as polyimides enhances the importance of the phthalonitrile system. Due to the low water absorptivity, processability at a temperature comparable to epoxy resins, and the superior thermo-oxidative stability of fully cured phthalonitriles to temperatures in excess of 375° C., the reactive PN prepolymer intermediate has the potential for a variety of applications.

The following examples are given to illustrate specific applications. These specific examples are not intended to limit the scope of the disclosure in this application.

Example 1

Formation of Reactive PN Prepolymer Intermediate from Reaction of 2:1 Oligomeric Phthalonitrile and Bis[4-(4-Aminophenoxy)Phenyl]Sulfone (p-BAPS, 20 wt %)

A 2:1 oligomeric phthalonitrile (6.00 g), prepared from an excessive amount of bisphenol A and 4,4-dichlorobenzenophenone, and p-BAPS (1.2 g) was stirred at 250° C. for 2 minutes to thoroughly mix and subsequently heated at 250° C. for an additional 45 min. The resulting mixture had darkened and had increased in viscosity due to the formation of the reactive PN prepolymer intermediate. The reactive PN prepolymer intermediate was quickly cooled to stop the reaction and used in subsequent studies.

Example 2

Rapid Curing of the Reactive PN Prepolymer Intermediate Prepared from Reaction of 2:1 Oligomeric Phthalonitrile and p-BAPS (20 wt %) at 250° C.

The p-BAPS/PN prepolymer intermediate mixture (3.00 g), prepared as in Example 1, was melted and further heated at 250° C. for 1 hr to afford a glassy polymer with gelation to a shaped solid occurring during the 1 hr thermal treatment. Upon post-curing to above 375° C. for 8 hr, the polymer no longer exhibited a $T_g$ and was considered fully cured. The polymer exhibited excellent thermal and oxidative stability up to 450° C. before any weight loss was detected as determined by a thermogravimetric analysis (TGA). Catastrophic decomposition occurred after 500° C. in air.

Example 3

Curing of 2:1 Oligomeric Phthalonitrile with Reactive PN Prepolymer Intermediate with Resulting Composition Mixture Containing 5 wt % p-BAPS at 250° C.

The 2:1 oligomeric phthalonitrile (6.00 g), prepared from an excessive amount of bisphenol A and 4,4-dichlorobenzenophenone, and the reactive PN pre-polymer intermediate (1.5 g), prepared as in Example 1, were stirred at 250° C. for 2 minutes to thoroughly mix with the resulting composition containing about 5 wt % p-BAPS. After 30 minutes at 250° C., the resulting reactive phthalonitrile prepolymer intermediate and oligomeric phthalonitrile mixture darkened and began to rapidly turn green with an increase in viscosity. The mixture was placed in a furnace and cured under air by heating at 250° C. for 16 hr (overnight) to afford a polymer with gelation to a shaped solid occurring after 1 hr. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 4

Curing of 2:1 Oligomeric Phthalonitrile with Reactive PN Prepolymer Intermediate with Resulting Composition Mixture Containing 5 wt % p-BAPS at 300° C.

The 2:1 oligomeric phthalonitrile (6.00 g), prepared from an excessive amount of bisphenol A and 4,4-dichlorobenzenophenone, and the reactive PN prepolymer intermediate (1.5 g), prepared as in Example 1, were stirred at 250° C. for 2 minutes to thoroughly mix with the resulting composition containing about 5 wt % p-BAPS. After 10 minutes at 300° C., the resulting reactive phthalonitrile prepolymer intermediate and oligomeric phthalonitrile mixture darkened and began to rapidly turn green with an increase in viscosity. The mixture was placed in a furnace and cured under nitrogen by heating at 300° C. for 4 hr to afford a polymer with gelation to a shaped solid occurring after 20 min. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 5

Formation of Reactive PN Prepolymer Intermediate from Reaction of 2:1 Oligomeric Phthalonitrile and p-BAPS (10 wt %)

A 2:1 oligomeric phthalonitrile (6.00 g), prepared from an excessive amount of bisphenol A and 4,4-dichlorobenzenophenone, and p-BAPS (0.60 g) was stirred at 250° C. for 2 minutes to thoroughly mix and subsequently heated at 250° C. for an additional 45 min. The resulting mixture had darkened and had increased in viscosity due to the formation of the reactive PN prepolymer intermediate. The reactive PN prepolymer intermediate was quickly cooled to stop the reaction and used in subsequent studies.

Example 6

Rapid Curing of the Reactive PN Prepolymer Intermediate Prepared from Reaction of 2:1 Oligomeric Phthalonitrile and p-BAPS (10 wt %) at 250° C.

The reactive PN prepolymer intermediate (1.00 g), prepared as in Example 5, was melted and further heated at 250° C. for 1 hr to afford a polymer with gelation to a shaped solid occurring during the 1 hr thermal treatment. Upon post-curing to above 375° C. for 8 hr, the polymer no longer exhibited a $T_g$. The polymer exhibited excellent thermal and oxidative stability up to 450° C. before any weight loss was detected as determined by TGA. Catastrophic decomposition occurred after 500° C. in air.

Example 7

Curing of 2:1 Oligomeric Phthalonitrile with Reactive PN Prepolymer Intermediate with Resulting Composition Mixture Containing 5 wt % p-BAPS at 250° C.

The 2:1 oligomeric phthalonitrile (6.00 g) and the reactive PN prepolymer intermediate (3.0 g), prepared in Example 5, were stirred at 250° C. for 2 minutes to thoroughly mix with the resulting composition containing 5 wt % of p-BAPS. After 30 minutes at 250° C., the resulting reactive phthalonitrile prepolymer intermediate and oligomeric phthalonitrile mixture darkened and began to rapidly turn green with an increase in viscosity. The mixture was placed in a furnace and cured under air by heating at 250° C. for 16 hr (overnight) to afford a polymer with gelation to a shaped solid occurring after 1 hr. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 8

Formation of Reactive PN Prepolymer Intermediate from Reaction of 2:1 Oligomeric Phthalonitrile and 1,4-Bis(4-Aminophenoxy)Benzene (p-APB, 13.5 wt %)

A 2:1 oligomeric phthalonitrile (6.00 g), prepared from an excessive amount of bisphenol A and 4,4-dichlorobenzenophenone, and p-APB (0.811 g), was stirred at 250° C. for 2 minutes to thoroughly mix and subsequently heated at 250° C. for an additional 30 min. The resulting mixture had darkened and had increased in viscosity due to the formation of the reactive PN prepolymer intermediate. The reactive PN prepolymer intermediate was quickly cooled to stop the reaction and used in subsequent studies.

Example 9

Rapid Curing of the Reactive PN Prepolymer Intermediate Prepared from Reaction of 2:1 Oligomeric Phthalonitrile and p-APB (13.5 wt %) at 250° C.

The PN prepolymer intermediate (2.00 g) prepared in Example 8 was melted and further heated at 250° C. for 1 hr to afford a glassy polymer with gelation to a shaped solid occurring during the 1 hr thermal treatment. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 10

Curing of 2:1 Oligomeric Phthalonitrile with Reactive PN Prepolymer Intermediate with Resulting Composition Mixture Containing 5 wt % p-APB at 250° C.

The 2:1 oligomeric phthalonitrile (6.00 g), prepared from an excessive amount of bisphenol A and 4,4-dichlorobenzenophenone, and the reactive PN pre-polymer intermediate (2.2 g), prepared as in Example 8, were stirred at 250° C. for 2 minutes to thoroughly mix with the resulting composition containing about 5 wt % p-APB. After 30 minutes at 250° C., the resulting reactive phthalonitrile prepolymer intermediate and oligomeric phthalonitrile mixture darkened and began to rapidly turn green with an increase in viscosity. The mixture was placed in a furnace and cured under air by heating at 250° C. for 16 hr (overnight) to afford a polymer with gelation to a shaped solid occurring after 1 hr. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 11

Curing of 2:1 Oligomeric Phthalonitrile with Reactive PN Prepolymer Intermediate with Resulting Composition Mixture Containing 5 wt % p-APB at 300° C.

The 2:1 oligomeric phthalonitrile (6.00 g), prepared from an excessive amount of bisphenol A and 4,4-dichlorobenzophenone, and the reactive PN pre-polymer intermediate (2.2 g), prepared as in Example 8, were stirred at 250° C. for 2 minutes to thoroughly mix with the resulting composition containing about 5 wt % p-APB. After 10 minutes at 300° C., the resulting reactive phthalonitrile prepolymer intermediate and oligomeric phthalonitrile mixture darkened and began to rapidly turn green with an increase in viscosity. The mixture was placed in a furnace and cured under nitrogen by heating at 300° C. for 4 hr to afford a polymer with gelation to a shaped solid occurring after 15 min. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 12

Formation of Reactive PN Prepolymer Intermediate from Reaction of 2:1 Oligomeric Phthalonitrile and p-APB (20 wt %)

A 2:1 oligomeric phthalonitrile (6.00 g), prepared from an excessive amount of bisphenol A and 4,4-dichlorobenzophenone, and p-APB (1.2 g) were stirred at 250° C. for 2 minutes to thoroughly mix and subsequently heated at 250° C. for an additional 30 min. The resulting mixture had darkened and had increased in viscosity due to the formation of the reactive PN prepolymer intermediate. The reactive PN prepolymer intermediate was quickly cooled to stop the reaction and used in subsequent studies.

Example 13

Rapid Curing of the Reactive PN Prepolymer Intermediate Prepared from Reaction of 2:1 Oligomeric Phthalonitrile and p-APB (20 wt %) at 250° C.

The PN prepolymer intermediate mixture (2.00 g) prepared in Example 12 was melted and further heated at 250° C. for 1 hr to afford a glassy polymer with gelation to a shaped solid occurring during the 1 hr thermal treatment. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 14

Curing of 2:1 Oligomeric Phthalonitrile with Reactive PN Prepolymer Intermediate with Resulting Composition Mixture Containing 5 wt % p-APB at 250° C.

The 2:1 oligomeric phthalonitrile (6.00 g), prepared from an excessive amount of bisphenol A and 4,4-dichlorobenzophenone, and the reactive PN pre-polymer intermediate (1.5 g), prepared as in Example 12, were stirred at 250° C. for 2 minutes to thoroughly mix the resulting composition containing about 5 wt % p-APB. After 30 minutes at 250° C., the resulting reactive phthalonitrile prepolymer intermediate and oligomeric phthalonitrile mixture darkened and began to rapidly turn green with an increase in viscosity. The mixture was placed in a furnace and cured under air by heating at 250° C. for 16 hr (overnight) to afford a polymer with gelation to a shaped solid occurring after 1 hr. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 15

Formation of Reactive PN Prepolymer Intermediate from Reaction of 2:1 Oligomeric Sulfone Phthalonitrile and Bis[4-(4-Aminophenoxy)Phenyl]Sulfone (m-BAPS, 20 wt %)

A 2:1 oligomeric phthalonitrile (6.00 g), prepared from an excessive amount of bisphenol A and bis(4-chlorophenyl)sulfone, and m-BAPS (1.2 g) was stirred at 250° C. for 2 minutes to thoroughly mix and subsequently heated at 250° C. for an additional 45 min. The resulting mixture had darkened and had increased in viscosity due to the formation of the reactive PN prepolymer intermediate. The reactive PN prepolymer intermediate was quickly cooled to stop the reaction and used in subsequent studies.

Example 16

Rapid Curing of the Reactive PN Prepolymer Intermediate Prepared from Reaction of 2:1 Oligomeric Sulfone Phthalonitrile and m-BAPS (20 wt %) at 250° C.

The m-BAPS/PN prepolymer intermediate mixture (3.00 g), prepared as in Example 15, was melted and further heated at 250° C. for 1 hr to afford a glassy polymer with gelation to a shaped solid occurring during the 1 hr thermal treatment. Upon post-curing to above 375° C. for 8 hr, the polymer no longer exhibited a $T_g$ and was considered fully cured. The polymer exhibited excellent thermal and oxidative stability up to 450° C. before any weight loss was detected as determined by a thermogravimetric analysis (TGA). Catastrophic decomposition occurred after 500° C. in air.

Example 17

Curing of 2:1 Oligomeric Sulfone Phthalonitrile with Reactive PN Prepolymer Intermediate with Resulting Composition Mixture Containing 5 wt % m-BAPS at 250° C.

The 2:1 oligomeric phthalonitrile (6.00 g), prepared from an excessive amount of bisphenol A and bis(4-chlorophenyl)sulfone, and the reactive PN pre-polymer intermediate (1.5 g), prepared as in Example 15, were stirred at 250° C. for 2 minutes to thoroughly mix with the resulting composition containing about 5 wt % m-BAPS. After 30 minutes at 250° C., the resulting reactive phthalonitrile prepolymer intermediate and oligomeric phthalonitrile mixture darkened and began to rapidly turn green with an increase in viscosity. The mixture was placed in a furnace and cured under air by heating at 250° C. for 16 hr (overnight) to afford a polymer with gelation to a shaped solid occurring after 1 hr. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 18

Curing of 2:1 Oligomeric Sulfone Phthalonitrile with Reactive PN Prepolymer Intermediate with Resulting Composition Mixture Containing 5 wt % m-BAPS at 300° C.

The 2:1 oligomeric phthalonitrile (6.00 g), prepared from an excessive amount of bisphenol A and bis(4-chlorophenyl) sulfone, and the reactive PN prepolymer intermediate (1.5 g), prepared as in Example 15, were stirred at 250° C. for 2 minutes to thoroughly mix with the resulting composition containing about 5 wt % m-BAPS. After 10 minutes at 300° C., the resulting reactive phthalonitrile prepolymer intermediate and oligomeric phthalonitrile mixture darkened and began to rapidly turn green with an increase in viscosity. The mixture was placed in a furnace and cured under nitrogen by heating at 300° C. for 4 hr to afford a polymer with gelation to a shaped solid occurring after 10 min. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Example 19

Formation of Reactive PN Prepolymer Intermediate from Reaction of 2:1 Oligomeric Sulfone Phthalonitrile and m-BAPS (10 wt %)

A 2:1 oligomeric phthalonitrile (6.00 g), prepared from an excessive amount of bisphenol A and bis(4-chlorophenyl) sulfone, and m-BAPS (0.60 g) was stirred at 250° C. for 2 minutes to thoroughly mix and subsequently heated at 250° C. for an additional 45 min. The resulting mixture had darkened and had increased in viscosity due to the formation of the reactive PN prepolymer intermediate. The reactive PN prepolymer intermediate was quickly cooled to stop the reaction and used in subsequent studies.

Example 20

Rapid Curing of the Reactive PN Prepolymer Intermediate Prepared from Reaction of 2:1 Oligomeric Sulfone Phthalonitrile and m-BAPS (10 wt %) at 250° C.

The reactive PN prepolymer intermediate (1.00 g), prepared as in Example 19, was melted and further heated at 250° C. for 1 hr to afford a polymer with gelation to a shaped solid occurring during the 1 hr thermal treatment. Upon post-curing to above 375° C. for 8 hr, the polymer no longer exhibited a $T_g$. The polymer exhibited excellent thermal and oxidative stability up to 450° C. before any weight loss was detected as determined by TGA. Catastrophic decomposition occurred after 500° C. in air.

Example 21

Curing of 2:1 Oligomeric Sulfone Phthalonitrile with Reactive PN Prepolymer Intermediate with Resulting Composition Mixture Containing 5 wt % m-BAPS at 250° C.

The 2:1 oligomeric phthalonitrile (6.00 g) and the reactive PN prepolymer intermediate (3.0 g), prepared in Example 5, were stirred at 250° C. for 2 minutes to thoroughly mix with the resulting composition containing about 2.5 wt % of m-BAPS. After 30 minutes at 250° C., the resulting reactive phthalonitrile prepolymer intermediate and oligomeric phthalonitrile mixture darkened and began to rapidly turn green with an increase in viscosity. The mixture was placed in a furnace and cured under air by heating at 250° C. for 16 hr (overnight) to afford a polymer with gelation to a shaped solid occurring after 1 hr. Upon post-curing to above 375° C. for 8 hr, the polymer no longer exhibited a $T_g$ and was considered to be fully cured. The polymer exhibited excellent thermal and oxidative stability up to 450° C. before any weight loss was detected as determined by TGA. Catastrophic decomposition occurred after 500° C. in air.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A compound comprising:
   one or more first repeat units having the formula:

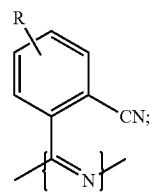

one or more terminating Ar—NH— groups bound to carbon radicals; and
   one or more terminating —H groups bound to nitrogen radicals;
   wherein each R is an organic group;
   wherein each Ar is an aromatic group; and
   wherein the compound is not a thermoset.

2. The compound of claim 1, wherein the compound is in solid form.

3. A composition comprising at least 1 wt % of the compound of claim 1.

4. The compound of claim 1, wherein the compound has the formula:

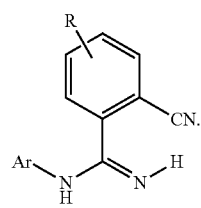

5. The compound of claim 1, wherein the compound has the formula:

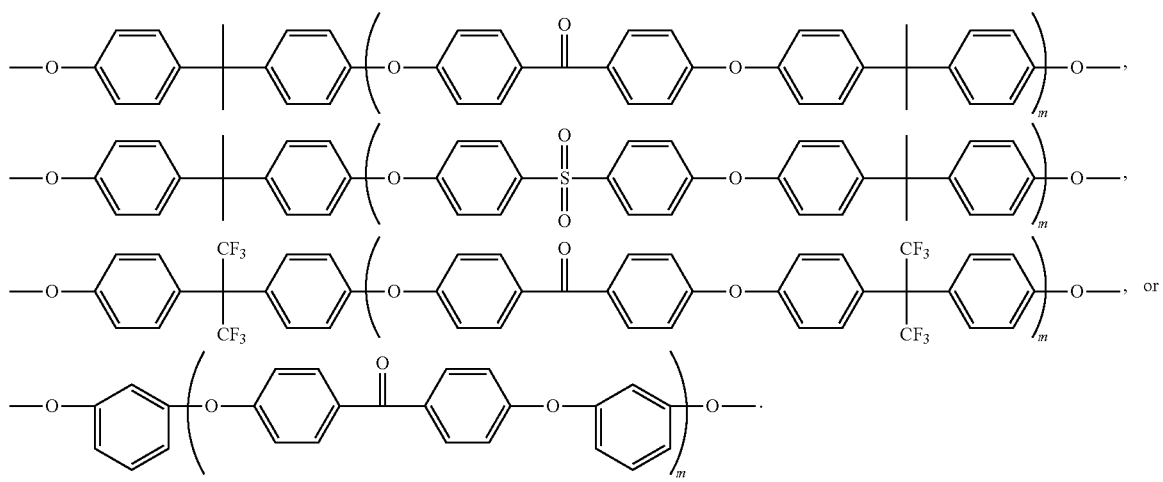

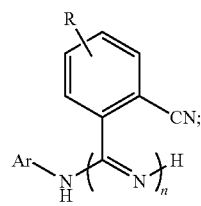

wherein n is an integer that is at least 2.

6. The compound of claim 1, wherein the Ar—NH— group is a residue of
bis[4-(4-aminophenoxy)phenyl]sulfone, bis[4-(3-aminophenoxy)phenyl]sulfone, 1,3-bis(3-aminophenoxy)benzene, or 1,4-bis(4-aminophenoxy)benzene.

7. The compound of claim 1;
wherein at least one R group is:

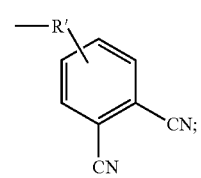

wherein each R' group has the formula:

$$-O-Ar^1-(O-Ar^2-O-Ar^1)_{\overline{m}}O-;$$

wherein each $Ar^1$ and $Ar^2$ is an aromatic group; and
wherein m is a non-negative integer.

8. The compound of claim 7, wherein each R' group has the formula:

9. The compound of claim 7, wherein the $Ar^2$ group comprises a carbonyl group, a sulfonyl group, a sulfinyl group, or a phosphoryl group.

10. The compound of claim 1, wherein the compound further comprises one or more of:

1) one or more second repeat units having the formula:

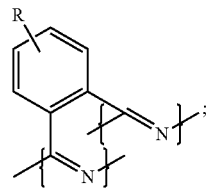

2) one or more third repeat units having the formula:

3) one or more of the first, second, or third repeat units, wherein at least one R group is:

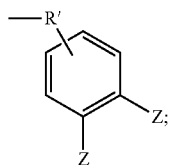

wherein is each Z is —C≡N or

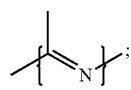

and
wherein each R' is an organic group.

11. A method comprising:
mixing an aromatic amine having the formula Ar—NH$_2$ with a phthalonitrile compound having the formula:

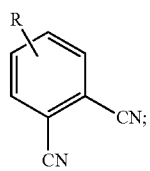

wherein each Ar is an aromatic group; and
wherein R is an organic group; and
heating the mixture to form a compound comprising:
one or more first repeat units having the formula:

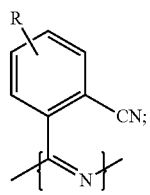

one or more terminating Ar—NH— groups bound to carbon radicals; and
one or more terminating —H groups bound to nitrogen radicals;
wherein the compound is not a thermoset; and
cooling the mixture before the onset of gelation.

12. The method of claim 11, wherein the mixture is heated to a temperature of 150° C. to 250° C.

13. The method of claim 11, wherein the aromatic amine is bis[4-(4-aminophenoxy)phenyl]sulfone, bis[4-(3-aminophenoxy)phenyl]sulfone, 1,3-bis(3-aminophenoxy)benzene, or 1,4-bis(4-aminophenoxy)benzene.

14. The method of claim 11;
wherein the phthalonitrile compound has the formula:

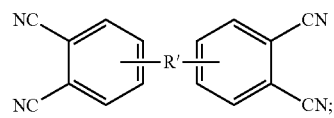

and
wherein each R' is an organic group.

15. The method of claim 14, wherein the phthalonitrile compound has the formula:

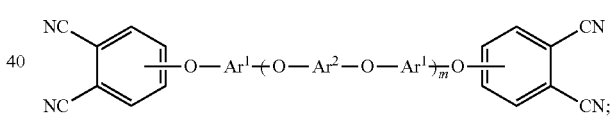

wherein each Ar$^1$ and Ar$^2$ is an aromatic group; and
wherein m is a non-negative integer.

16. The method of claim 15, wherein the phthalonitrile compound has the formula:

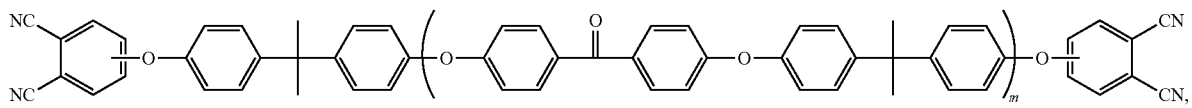

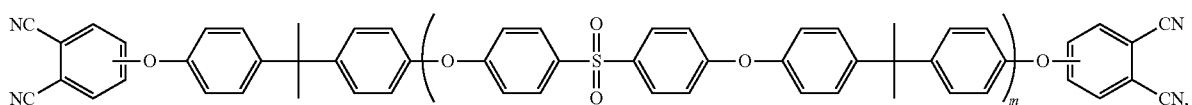

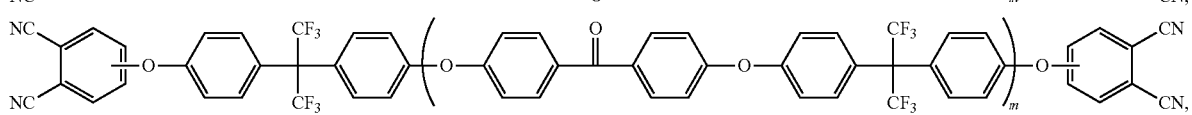

or

-continued

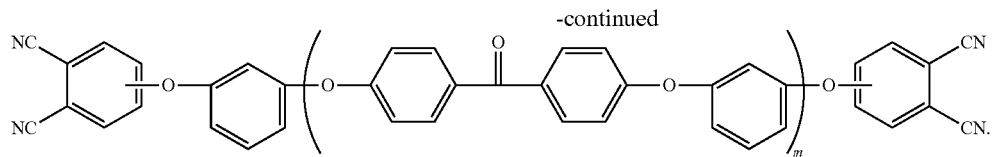

17. The method of claim 15, wherein the $Ar^2$ group comprises a carbonyl group, a sulfonyl group, a sulfinyl group, or a phosphoryl group.

18. The method of claim 11, further comprising:
heating the cooled mixture under thermal conditions that convert the compound to a thermoset.

19. The method of claim 18, further comprising:
adding additional phthalonitrile monomer while heating the cooled mixture.

20. The method of claim 11, wherein the compound further comprises one or more of:
1) one or more second repeat units having the formula:

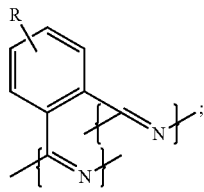

2) one or more third repeat units having the formula:

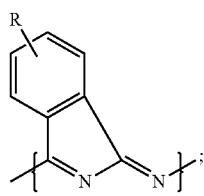

and
3) one or more of the first, second, or third repeat units, wherein at least one R group is:

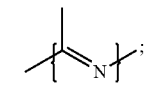

wherein is each Z is —C≡N or and
wherein each R' is an organic group.

* * * * *